(12) United States Patent
Lee et al.

(10) Patent No.: US 11,668,438 B2
(45) Date of Patent: Jun. 6, 2023

(54) FLUID CHARGING SYSTEM, NOZZLE DEVICE, AND RECEPTACLE DEVICE

(71) Applicants: HYUNDAI MOTOR COMPANY, Seoul (KR); KIA MOTORS CORPORATION, Seoul (KR)

(72) Inventors: Hyun Woo Lee, Suwon-si (KR); Kwang Min Oh, Hwaseong-si (KR); Su Hwan Cho, Seoul (KR); Bum Wook Roh, Seoul (KR); Chang Ho Jung, Suwon-si (KR); In Sung Chang, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1 day.

(21) Appl. No.: 17/199,042

(22) Filed: Mar. 11, 2021

(65) Prior Publication Data
US 2021/0301982 A1 Sep. 30, 2021

(30) Foreign Application Priority Data

Mar. 30, 2020 (KR) .................... 10-2020-0038617
Jan. 15, 2021 (KR) .................... 10-2021-0005734

(51) Int. Cl.
*F17C 13/10* (2006.01)
*F17C 13/02* (2006.01)
*F17C 7/00* (2006.01)

(52) U.S. Cl.
CPC ............. *F17C 13/10* (2013.01); *F17C 7/00* (2013.01); *F17C 13/026* (2013.01);
(Continued)

(58) Field of Classification Search
CPC .......... F17C 13/10; F17C 7/00; F17C 13/026; F17C 2205/0376; F17C 2221/012;
(Continued)

(56) References Cited

U.S. PATENT DOCUMENTS 4,347,875 A * 9/1982 Columbus ............. B01L 3/0275
141/311 A
5,301,723 A * 4/1994 Goode ...................... F17C 5/02
141/69
(Continued)

FOREIGN PATENT DOCUMENTS

FR 3104671 A1 * 6/2021 .............. F17C 13/10

OTHER PUBLICATIONS

Office Action cited in corresponding U.S. Appl. No. 17/081,601; dated Oct. 13, 2022; 13 pp.

*Primary Examiner* — Jason K Niesz
(74) *Attorney, Agent, or Firm* — Lempia Summerfield Katz LLC

(57) ABSTRACT

A nozzle device includes: a charging nozzle configured to supply a charging fluid and provided to be connected to a receptacle provided in a subject; a cover member to surround the charging nozzle and the receptacle; and a fluid supply unit to supply an interior of the cover member with an anti-freezing fluid for inhibiting freezing between the charging nozzle and the receptacle, thereby obtaining an advantageous effect of preventing freezing of the receptacle and improving safety and reliability. In addition, the nozzle device may include a hydrophobic coating layer for inhibiting freezing.

15 Claims, 8 Drawing Sheets

(52) U.S. Cl.
CPC .............................. *F17C 2205/0376* (2013.01); *F17C 2221/012* (2013.01); *F17C 2227/0309* (2013.01); *F17C 2250/046* (2013.01); *F17C 2250/0439* (2013.01); *F17C 2250/0631* (2013.01); *F17C 2250/0636* (2013.01); *F17C 2260/032* (2013.01); *F17C 2270/0168* (2013.01); *F17C 2270/0184* (2013.01)

(58) Field of Classification Search
CPC ...... F17C 2227/0309; F17C 2250/0439; F17C 2250/046; F17C 2250/0631; F17C 2250/0636; F17C 2260/032; F17C 2270/0168; F17C 2270/0184
USPC .......................................................... 141/285
See application file for complete search history.

(56) References Cited

U.S. PATENT DOCUMENTS

| | | | | |
|---|---|---|---|---|
| 5,557,940 | A * | 9/1996 | Hendrickx ................. | F17C 7/00 62/149 |
| 6,923,008 | B2 * | 8/2005 | Brook ..................... | F17C 13/10 62/50.7 |
| 8,776,843 | B2 * | 7/2014 | Komiya .................... | B65B 3/04 141/69 |
| 2011/0226608 | A1 * | 9/2011 | Lautenschlager .......... | B01J 3/03 422/243 |
| 2013/0327439 | A1 * | 12/2013 | Pitney ....................... | F17C 5/06 141/346 |
| 2014/0332570 | A1 * | 11/2014 | Akutsu .................... | B05D 5/00 428/34.1 |
| 2015/0298962 | A1 * | 10/2015 | Shelton ................ | B67D 7/3218 141/82 |
| 2016/0129390 | A1 * | 5/2016 | Williams ........... | B01D 53/0454 95/122 |
| 2018/0266633 | A1 * | 9/2018 | Fujita ...................... | F17C 5/007 |
| 2018/0354778 | A1 * | 12/2018 | Rathbun ............... | B67D 7/3281 |
| 2021/0301982 | A1 | 9/2021 | Lee et al. | |

* cited by examiner

FLUID CHARGING SYSTEM, NOZZLE DEVICE, AND RECEPTACLE DEVICE

CROSS-REFERENCE TO RELATED APPLICATIONS

This application claims priority to and the benefit of Korean Patent Application No. 10-2020-0038617, filed on Mar. 30, 2020 and Korean Patent Application No. 10-2021-0005734, filed on Jan. 15, 2021, the entire contents of both of which are incorporated herein by reference.

This application is related to U.S. patent application Ser. No. 17/081,601, filed on Oct. 27, 2020, the entire contents of which is hereby incorporated by reference.

FIELD

The present disclosure relates to a fluid charging system, a nozzle device, and a receptacle device to improve safety and reliability.

BACKGROUND

The statements in this section merely provide background information related to the present disclosure and may not constitute prior art.

A fuel cell electric vehicle (FCEV) produces electrical energy from an electrochemical reaction between oxygen and hydrogen in a fuel cell stack and uses the electrical energy as a power source.

The fuel cell electric vehicle may continuously generate electricity, regardless of a capacity of a battery, by being supplied with fuel and air from the outside, and thus has high efficiency, and emits almost no contaminant. By virtue of these advantages, continuous research and development is being conducted on the fuel cell electric vehicle.

The fuel cell electric vehicle is provided with a hydrogen tank, and hydrogen is stored in the hydrogen tank through a hydrogen charging line of a hydrogen storage system. The hydrogen stored in the hydrogen tanks is depressurized by a regulator, supplied to the fuel cell stack along a hydrogen supply line, and then used to produce electrical energy.

In addition, the fuel cell electric vehicle is provided with a hydrogen charging receptacle as a kind of connector connected to a charging nozzle for supplying hydrogen gas.

However, we have discovered that the connection part between the charging nozzle and the receptacle (the periphery of the receptacle) is frozen due to a very low hydrogen charging temperature (e.g., −33° C. to −40° C.) during a rapid hydrogen charging process, and the freezing makes it impossible to separate the charging nozzle from the receptacle in a timely manner after completing the hydrogen charging process.

SUMMARY

The present disclosure provides a fluid charging system, a nozzle device, and a receptacle device, which are capable of inhibiting or preventing freezing of a receptacle connected to a charging nozzle and improving safety and reliability.

In addition, the present disclosure may prevent freezing of a receptacle during a hydrogen charging process and easily separate a charging nozzle from the receptacle after completing the hydrogen charging process.

Moreover, the present disclosure may reduce or minimize a deterioration in durability and safety caused by freezing of a receptacle.

In one form of the present disclosure, a nozzle device includes: a charging nozzle configured to supply a charging fluid and provided to be connected to a receptacle provided in a subject, a cover member configured to surround the charging nozzle and the receptacle, and a fluid supply unit configured to supply an interior of the cover member with an anti-freezing fluid for inhibiting or preventing freezing between the charging nozzle and the receptacle.

This is to prevent freezing of the receptacle connected to the charging nozzle and improve safety and reliability.

The present disclosure inhibits freezing of the receptacle and improves safety and reliability by supplying the anti-freezing fluid for preventing freezing into the cover member provided to surround the charging nozzle and the receptacle.

The fluid supply unit may have various structures capable of supplying the anti-freezing fluid into the cover member.

For example, the fluid supply unit may include: an anti-freezing fluid supply part configured to supply the anti-freezing fluid, and a heating part configured to heat the anti-freezing fluid, which is supplied into the cover member from the anti-freezing fluid supply part, to a preset temperature.

According to the exemplary form of the present disclosure, the fluid supply unit may include a moisture removing part configured to remove moisture from the anti-freezing fluid to be supplied into the cover member from the anti-freezing fluid supply part.

As described above, since the moisture is removed from the anti-freezing fluid to be supplied into the cover member, it is possible to obtain an advantageous effect of more effectively preventing the connection part between the charging nozzle and the receptacle from freezing due to a very low hydrogen charging temperature during the hydrogen charging process.

According to one exemplary form of the present disclosure, the anti-freezing fluid supply part or the heating part may be configured to serve as the moisture removing part without separately providing the moisture removing part. For example, the anti-freezing fluid supply part and the moisture removing part may be provided as a first integrated module configured by integrating the anti-freezing fluid supply part and the moisture removing part. As another example, the heating part and the moisture removing part may be provided as a second integrated module configured by integrating the heating part and the moisture removing part.

As described above, since the first integrated module (or the second integrated module) serves to both supply the anti-freezing fluid and remove the moisture from the anti-freezing fluid, it is not necessary to additionally provide the moisture removing part. As a result, it is possible to obtain an advantageous effect of simplifying the structure, improving a degree of design freedom and spatial utilization, and reducing costs required to manufacture the facility.

According to one exemplary form of the present disclosure, the anti-freezing fluid may be supplied to all positions in the cover member at which the freezing occurs.

In some forms of the present disclosure, the nozzle device may include: a first flow path formed in the cover member and configured such that the anti-freezing fluid is introduced into the first flow path from the fluid supply unit; a second flow path formed between the nozzle body and the gripping unit so as to communicate with the first flow path; a third flow path formed between the cover member and the gripping unit so as to communicate with the first flow path; and a fourth flow path formed between the receptacle and the cover member so as to communicate with the second flow path and the third flow path such that the anti-freezing fluid is discharged to the outside of the cover member through the fourth flow path.

According to another exemplary form of the present disclosure, the nozzle device may include a control unit configured to selectively control any one or both of a flow rate and a temperature of the anti-freezing fluid to be supplied into the cover member.

In particular, the nozzle device may include a temperature sensor configured to measure a temperature of outside air, and a humidity sensor configured to measure humidity of outside air. The control unit may control any one or both of the flow rate and the temperature of the anti-freezing fluid based on the sensed values sensed by the temperature sensor and the humidity sensor.

According to other exemplary form of the present disclosure, the nozzle device may include at least any one of a first hydrophobic coating layer formed on at least any one of an outer surface of the nozzle body and an inner surface of the gripping unit, a second hydrophobic coating layer formed on an outer surface of the receptacle, and a third hydrophobic coating layer formed on an inner surface of the cover member.

As described above, since the surface (e.g., the outer surface of the nozzle body, the inner surface of the gripping unit, and the inner surface of the cover member), which may be frozen, is subjected to the hydrophobic treatment, it is possible to minimize attachment of the moisture contained in the air (or the moisture contained in the anti-freezing fluid) to the surface that may be frozen, and as a result, it is possible to obtain an advantageous effect of more effectively preventing the connection part between the charging nozzle and the receptacle from freezing.

In one form of the present disclosure, the charging nozzle may have various structures capable of being selectively and separably coupled to the receptacle.

For example, the charging nozzle may include a nozzle body provided to be connected to the receptacle, and a gripping unit connected to the nozzle body and configured to be selectively constrained by a circumferential surface of the receptacle.

In another form, the gripping unit may include a gripper rotatably connected to the nozzle body and configured to be supported on the circumferential surface of the receptacle, and an elastic member configured to elastically support a rotation of the gripper with respect to the nozzle body.

According to another exemplary form of the present disclosure, the charging fluid may include hydrogen, and the anti-freezing fluid may include air.

According to one exemplary form of the present disclosure, a nozzle device may include: a charging nozzle configured to supply a charging fluid and provided to be connected to a receptacle provided in a subject; and a first hydrophobic coating layer provided on a surface of the charging nozzle.

In particular, the charging nozzle may include: a nozzle body provided to be connected to the receptacle; and a gripping unit connected to the nozzle body and configured to be selectively constrained by a circumferential surface of the receptacle, and the first hydrophobic coating layer may be provided on a surface of at least any one of the nozzle body and the gripping unit.

According to another exemplary form of the present disclosure, a nozzle device may include: a charging nozzle configured to supply a charging fluid and provided to be connected to a receptacle provided in a subject; a cover member configured to surround the charging nozzle and the receptacle; and a third hydrophobic coating layer provided on an inner surface of the cover member.

According to still another exemplary form of the present disclosure, a receptacle device may include: a receptacle to which a charging nozzle configured to supply a charging fluid is connected; and a second hydrophobic coating layer provided on at least any one of an outer surface and an inner surface of the receptacle.

According to another aspect of the present disclosure, a fluid charging system may include: a charging nozzle configured to supply a charging fluid; a receptacle provided in a subject and configured to be connected to the charging nozzle; a cover member configured to surround the charging nozzle and the receptacle; and a fluid supply unit configured to supply an interior of the cover member with an anti-freezing fluid for preventing freezing between the charging nozzle and the receptacle.

According to still another aspect of the present disclosure, a fluid charging system may include: a charging nozzle configured to supply a charging fluid; a receptacle provided in a subject and configured to be connected to the charging nozzle; a cover member provided to surround the charging nozzle and the receptacle; and a hydrophobic coating layer provided on at least any one of a surface of the charging nozzle, a surface of the receptacle, and an inner surface of the cover member.

In particular, the fluid charging system may include a fluid supply unit configured to supply an interior of the cover member with an anti-freezing fluid configured to inhibit freezing between the charging nozzle and the receptacle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
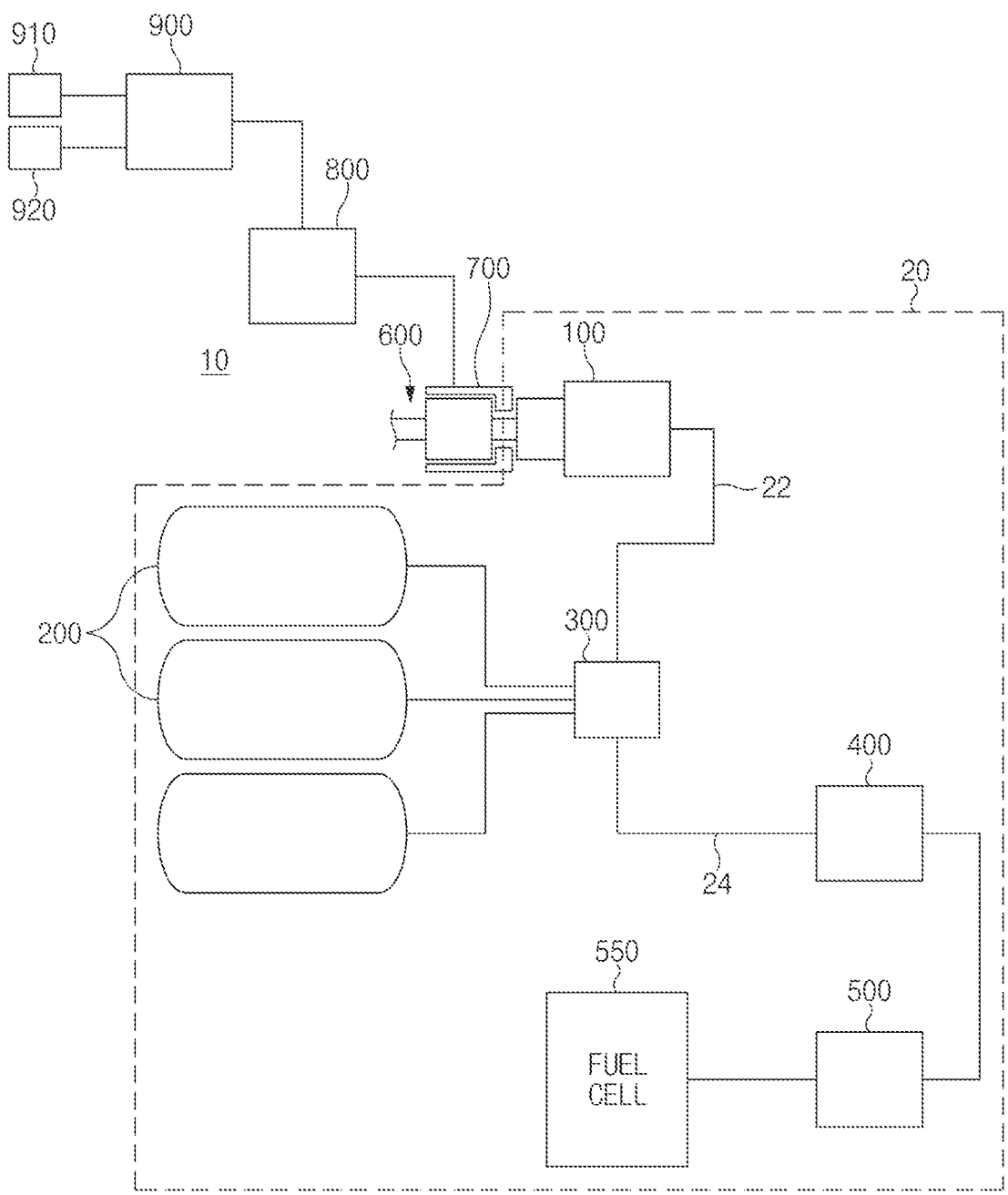
FIG. 1 is a view for explaining a fluid charging system according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

However, the technical spirit of the present disclosure is not limited to some exemplary forms described herein but may be implemented in various different forms. One or more of the constituent elements in the exemplary forms may be selectively combined and substituted within the scope of the technical spirit of the present disclosure.

In addition, unless otherwise specifically and explicitly defined and stated, the terms (including technical and scientific terms) used in the exemplary forms of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary form of the present disclosure are for explaining the exemplary forms, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary forms of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 6, a fluid charging system 10 according to an exemplary form of the present disclosure includes: a charging nozzle 600 configured to supply a charging fluid, a receptacle 100 provided in a subject and configured to be connected to the charging nozzle 600, a cover member 700 configured to surround the charging nozzle 600 and the receptacle 100, and a fluid supply unit 800 configured to supply an interior of the cover member 700 with an anti-freezing fluid for preventing freezing between the charging nozzle 600 and the receptacle 100. For reference, the fluid charging system 10 according to the present disclosure may be used to charge various types of subjects with various types of charging fluids in accordance with required conditions and design specifications, and the present disclosure is not restricted or limited by the subject and the type of charging fluid.

Further, the term 'subject' in the present disclosure is defined as including both a movable subject such as a vehicle and a non-movable subject such as a storage facility fixed to the ground.

In addition, the term 'charging fluid' in the present disclosure is defined as being any one of a gas-phase fluid and a liquid-phase fluid or including a fluid mixture made by mixing a gas-phase fluid and a liquid-phase fluid.

Hereinafter, a configuration in which the fluid charging system 10 according to the exemplary form of the present disclosure is used to charge a fuel cell electric vehicle 20 (a passenger vehicle or a commercial vehicle) (the subject) with hydrogen (the charging fluid) will be described as an example.

Referring to FIG. 1, the fuel cell electric vehicle 20 may be provided with a receptacle 100, and a charging nozzle 600 for supplying hydrogen may be connected to the receptacle 100.

Various types of receptacles 100, which may be connected (coupled) to the charging nozzle 600 with a typical coupling structure (e.g., a male-female coupling structure), may be used as the receptacle 100, and the present disclosure is not restricted or limited by the type and the structure of the receptacle 100.

The fuel cell electric vehicle 20 is provided with hydrogen tanks 200 for storing hydrogen, and a manifold 300 is connected to the hydrogen tanks 200.

For example, the fuel cell electric vehicle 20 may be provided with three hydrogen tanks 200, and the manifold 300 is connected in common to the three hydrogen tanks 200. According to another exemplary form of the present disclosure, the fuel cell electric vehicle may be provided with four or more or two or less hydrogen tanks, and the present disclosure is not restricted or limited by the number of hydrogen tanks and the arrangement form of the hydrogen tanks.

The manifold 300 may have various structures capable of dividing a flow path of hydrogen, and the present disclosure is not restricted or limited by the type and the structure of the manifold 300. For example, the manifold 300 may have a first port (not illustrated) connected to a hydrogen supply line 24, a second to fourth ports (not illustrated) connected to the three hydrogen tanks 200, and a fifth port (not illustrated) connected to a hydrogen charging line 22.

The fuel cell electric vehicle 20 may include the hydrogen charging line 22 that connects the receptacle 100 and the manifold 300. The hydrogen, which is supplied to the receptacle 100 through the charging nozzle 600, is stored in the hydrogen tanks 200 via the hydrogen charging line 22 and the manifold 300.

In addition, the fuel cell electric vehicle 20 includes the hydrogen supply line 24 through which the hydrogen stored in the hydrogen tanks 200 is supplied to a fuel cell stack 550.

In one form, the hydrogen supply line 24 is configured to connect the manifold 300 and the fuel cell stack 550 provided in the fuel cell electric vehicle 20, and the hydrogen stored in the hydrogen tanks 200 is supplied to the fuel cell stack 550 via the manifold 300 and the hydrogen supply line 24.

For reference, the fuel cell stack 550 may have various structures capable of producing electricity by means of an oxidation-reduction reaction between fuel (e.g., hydrogen) and an oxidant (e.g., air).

For example, the fuel cell stack 550 includes: a membrane electrode assembly (MEA) (not illustrated) having catalyst electrode layers, in which electrochemical reactions occur, at both sides of an electrolyte membrane through which hydrogen ions move; a gas diffusion layer (GDL) (not illustrated) configured to uniformly distribute reactant gases and serve to transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell stack 550, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively delivered to the cathode through the electrolyte membrane which is a positive ion exchange membrane, and at the same time, the electrons are delivered to the cathode through the gas diffusion layer and the separator which are conductors.

At the cathode, the hydrogen ions supplied through the electrolyte membrane and the electrons delivered through the separator meet oxygen in the air supplied to the cathode by an air supply device to create a reaction of producing water. Due to the movement of the hydrogen ions, the electrons flow through external conductive wires, and an electric current is produced due to the flow of the electrons.

In addition, the hydrogen supply line 24 may be provided with a regulator 400 configured to depressurize hydrogen to be supplied to the fuel cell stack 550, and a hydrogen supply device (fuel processing system (FPS)) 500 configured to adjust the supply amount of hydrogen to be supplied to the fuel cell stack 550.

In one form, the regulator 400 is connected to the hydrogen supply line 24 and disposed between the manifold 300 and the fuel cell stack 550. The high-pressure (e.g., 700 bar) hydrogen supplied through the hydrogen supply line 24 may be supplied to the fuel cell stack 550 in a state in which the hydrogen is depressurized (e.g., 16 bar) while passing through the regulator 400.

The hydrogen supply device 500 is connected to the hydrogen supply line 24 and disposed between the regulator 400 and the fuel cell stack 550. The hydrogen supply device 500 adjusts the supply amount of hydrogen to be supplied to the fuel cell stack 550. In addition, the supply of the hydrogen to the fuel cell stack 550 may be selectively permitted or shut off by the hydrogen supply device 500.

Figure 3:
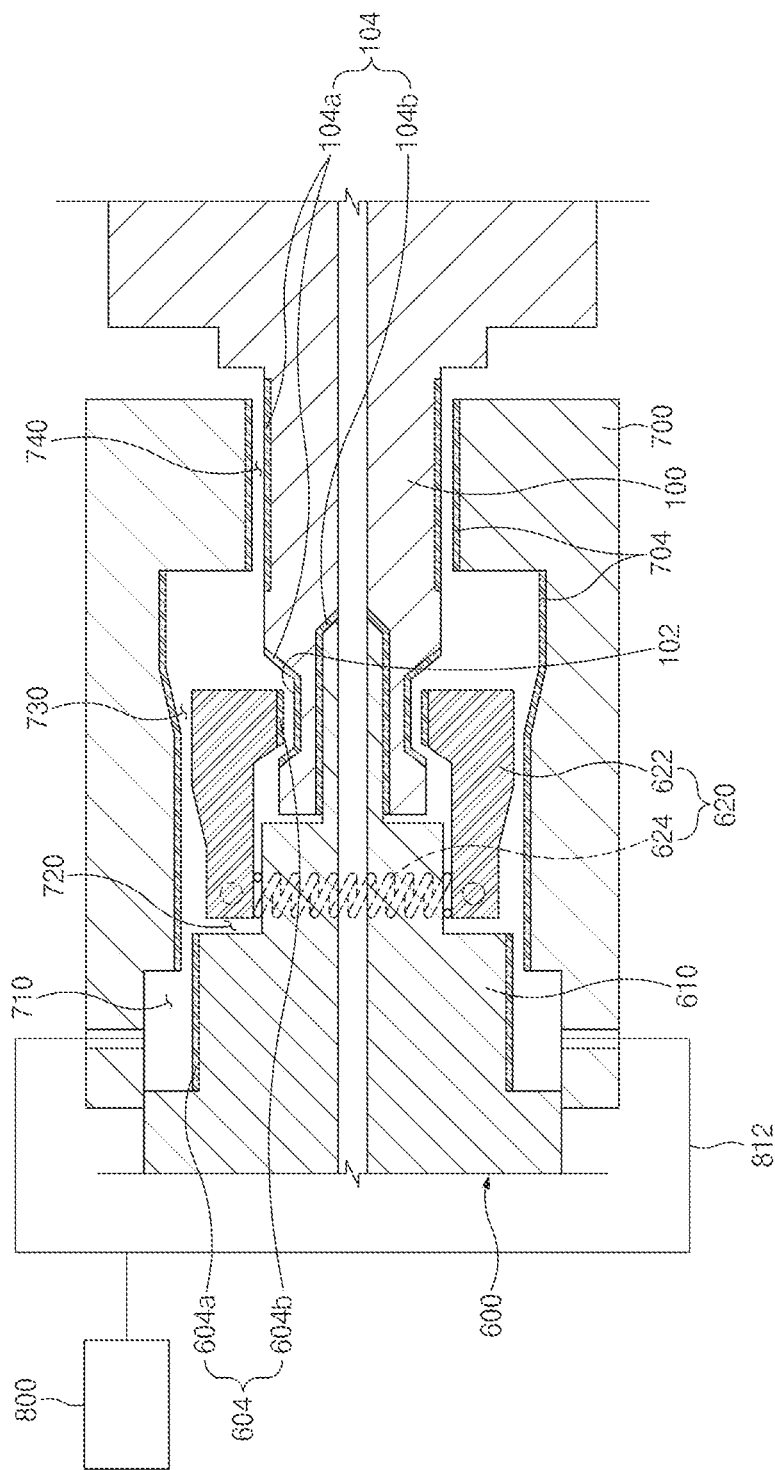
FIG. 3 is a view for explaining a charging nozzle in the fluid charging system in one form of the present disclosure.
Figure 4:
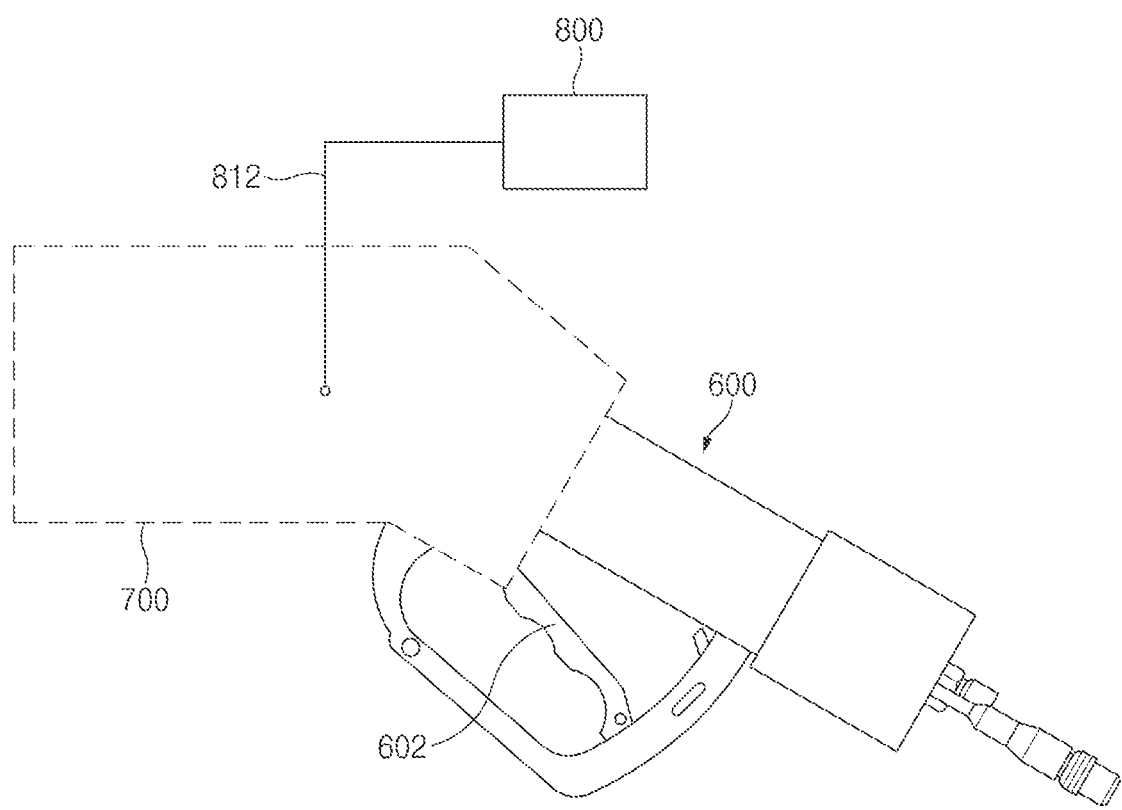
FIG. 4 is a view for explaining a cover member in the fluid charging system according to another exemplary form of the present disclosure.

Referring to FIGS. 3 and 4, the charging nozzle 600 is coupled to the receptacle 100 and supplies the hydrogen (charging fluid) H to the fuel cell electric vehicle 20 through the receptacle 100.

For example, the charging nozzle 600 may supply the fuel cell electric vehicle 20 with hydrogen stored in a charging facility (not illustrated) of a hydrogen charging station.

The charging nozzle 600 may have various structures capable of being selectively separably coupled to the receptacle 100, and the present disclosure is not restricted or limited by the structure and the shape of the charging nozzle 600.

For example, the charging nozzle 600 includes a nozzle body 610 configured to be connected to the receptacle 100, and a gripping unit 620 connected to the nozzle body 610 and configured to be selectively constrained by a circumferential surface of the receptacle 100.

The nozzle body 610 may be connected to the receptacle 100 with a male-female coupling structure. In a state in which the nozzle body 610 is connected to the receptacle 100, the nozzle body 610 and the receptacle 100 may communicate with each other, and the hydrogen supplied through an interior of the nozzle body 610 may be introduced into the receptacle 100.

The gripping unit 620 may have various structures capable of selectively constraining the state in which the nozzle body 610 and the receptacle 100 are connected to each other. For example, the gripping unit 620 may include grippers 622 rotatably connected to the nozzle body 610 and configured to be supported on the circumferential surface of the receptacle 100, and an elastic member 624 configured to elastically support the rotations of the grippers 622 with respect to the nozzle body 610.

For example, the plurality of grippers 622 may be rotatably provided on the nozzle body 610 so as to be spaced apart from one another in a circumferential direction (a circumferential direction of the receptacle 100). The state in which the charging nozzle 600 and the receptacle 100 are connected to each other may be constrained or released as the grippers 622 are rotated in a direction in which ends of the respective grippers 622 are moved toward or away from an outer surface of the receptacle 100.

In particular, a recessed receiving groove 102 may be formed in a circumferential surface of the receptacle 100. When the respective grippers 622 are rotated in a direction in which the respective grippers 622 approach the outer surface of the receptacle 100, the ends of the respective grippers 622 may be received in the receiving groove 102. As described above, the receiving groove 102 is formed in the circumferential surface of the receptacle 100, and the ends of the grippers 622 are received in the receiving groove 102, such that the constrained state made by the grippers 622 may be stably maintained, thereby obtaining an advantageous effect of more securely maintaining the state in which the charging nozzle 600 and the receptacle 100 are connected to each other.

A typical spring capable of elastically supporting the rotations of the grippers 622 with respect to the nozzle body 610 may be used as the elastic member 624, and the present disclosure is not restricted or limited by the type and the structure of the elastic member 624.

For example, the elastic member 624 may provide elastic force so that the ends of the grippers 622 are rotated to approach (be constrained by) the outer surface of the receptacle 100.

An operational structure of the gripper 622 may be variously changed in accordance with required conditions and design specifications. For example, when an operating lever 602 provided in the charging nozzle 600 is released, the plurality of grippers 622 is rotated to be spaced apart from the outer surface of the receptacle 100, such that the constraint on the grippers 622 with respect to the receptacle 100 may be released. In contrast, when the operation of releasing the operating lever 602 is stopped, the grippers 622 may be returned back to an initial position (a position at which the grippers 622 are rotated to be close to the outer surface of the receptacle) by elastic force of the elastic member 624.

The cover member 700 is provided to surround the charging nozzle 600 and the receptacle 100.

The cover member 700 may have various structures capable of surrounding the charging nozzle 600 and the receptacle 100, and the present disclosure is not restricted or limited by the structure and the shape of the cover member 700.

For reference, in the present disclosure, the configuration in which the cover member 700 surrounds the charging nozzle 600 and the receptacle 100 is defined as including both a configuration in which the cover member 700 surrounds the entire circumference of the charging nozzle 600 and the entire circumference of the receptacle 100 and a configuration in which the cover member 700 partially surrounds a part of the circumference of the charging nozzle 600 and a part of the circumference of the receptacle 100.

In particular, the cover member 700 has a hollow structure (e.g., a hollow structure having a circular cross-sectional shape) that surrounds the entire coupling part between the charging nozzle 600 and the receptacle 100.

The fluid supply unit 800 is provided to supply the interior of the cover member 700 with an anti-freezing fluid for preventing freezing between the charging nozzle 600 and the receptacle 100.

As described above, since the anti-freezing fluid is supplied into the cover member 700, the connection part between the charging nozzle 600 and the receptacle 100 (the periphery of the receptacle) may be heated, such that it is possible to obtain an advantageous effect of preventing the connection part between the charging nozzle 600 and the receptacle 100 from freezing due to a very low hydrogen charging temperature during the hydrogen charging process.

Various types of gas-phase fluids or liquid-phase fluids capable of preventing freezing between the charging nozzle 600 and the receptacle 100 may be used as the anti-freezing fluid, and the present disclosure is not restricted or limited by the type and the property of the anti-freezing fluid.

For example, air (e.g., heated air) may be used as the anti-freezing fluid.

The fluid supply unit 800 may have various structures capable of supplying the anti-freezing fluid into the cover member 700.

For example, the fluid supply unit 800 includes an anti-freezing fluid supply part 810 configured to supply the anti-freezing fluid, and a heating part 820 configured to heat the anti-freezing fluid, which is supplied into the cover member 700 from the anti-freezing fluid supply part 810, to a preset temperature.

The anti-freezing fluid supply part 810 is provided to supply air, and the present disclosure is not restricted or limited by the structure of the anti-freezing fluid supply part 810 and the method of supplying the anti-freezing fluid.

For example, an air compressor or an air storage tank, which is capable of supplying compressed air, may be used as the anti-freezing fluid supply part 810. According to another exemplary form of the present disclosure, a blower (e.g., a ring blower) or other air supply means may be used as the anti-freezing fluid supply part.

The anti-freezing fluid supply part 810 may be connected to the cover member 700 through a supply line 812, and the anti-freezing fluid supplied from the anti-freezing fluid supply part 810 may be supplied into the cover member 700 through the supply line 812.

For example, a plurality of supply lines 812 may be connected to the cover member 700, and the anti-freezing fluid may be supplied into the cover member 700 through the plurality of supply lines 812. The number of supply lines and the structure for connecting the supply line may be variously changed in accordance with required conditions and design specifications, and the present disclosure is not restricted or limited by the number of supply lines and the structure for connecting the supply line.

The heating part 820 is provided to heat the anti-freezing fluid, which is supplied into the cover member 700 from the anti-freezing fluid supply part 810, to a preset temperature.

A typical heater or various heating means capable of heating the anti-freezing fluid may be used as the heating part 820, and the present disclosure is not restricted or limited by the structure of the heating part 820 and the method of heating the anti-freezing fluid. Further, the heating part 820 may directly heat the anti-freezing fluid or indirectly heat the anti-freezing fluid by means of a separate heat transfer medium.

In particular, the heating part 820 may heat the anti-freezing fluid to a temperature that does not greatly affect a temperature of the hydrogen to be supplied to the receptacle 100 (i.e., a temperature that does not excessively raise a temperature of the hydrogen to be supplied).

According to one exemplary form of the present disclosure, a non-powered heater may be used as the heating part 820. For example, a typical vortex tube may be used as the non-powered heater.

For reference, the vortex tube may be configured to introduce compressed air into a vortex chamber, forcibly and spirally rotate the compressed air, and then discharge high-temperature air to a warm air outlet of the vortex tube, and the present disclosure is not restricted or limited by the structure and the shape of the vortex tube.

As described above, since the heating part 820 is configured as the non-powered heater, the heating part 820 may be freely installed without installation limitation (without limitation in installing electric facilities) in a hydrogen charging station designated as an explosion-proof zone (i.e., a zone in which explosion may occur and an electric facility is restrictively allowed). As a result, it is possible to obtain an advantageous effect of improving safety and reliability.

According to one exemplary form of the present disclosure, the fluid supply unit 800 may include a moisture removing part 830 configured to remove moisture from the anti-freezing fluid to be supplied into the cover member 700 from the anti-freezing fluid supply part 810.

As described above, since the moisture is removed from the anti-freezing fluid to be supplied into the cover member 700, it is possible to obtain an advantageous effect of more effectively preventing the connection part between the charging nozzle 600 and the receptacle 100 from freezing due to a very low hydrogen charging temperature during the hydrogen charging process.

The moisture removing part 830 may have various structures capable of removing the moisture from the anti-freezing fluid to be supplied into the cover member 700 from the anti-freezing fluid supply part 810, and the present disclosure is not restricted or limited by the moisture removing structure of the moisture removing part 830 and the method of removing the moisture.

For example, the moisture removing part 830 may remove moisture contained in air by heating the air through a typical heating method. According to another exemplary form of the present disclosure, it is possible to remove the moisture contained in the air by allowing the air supplied from the anti-freezing fluid supply part to pass through a filter.

Figure 2:
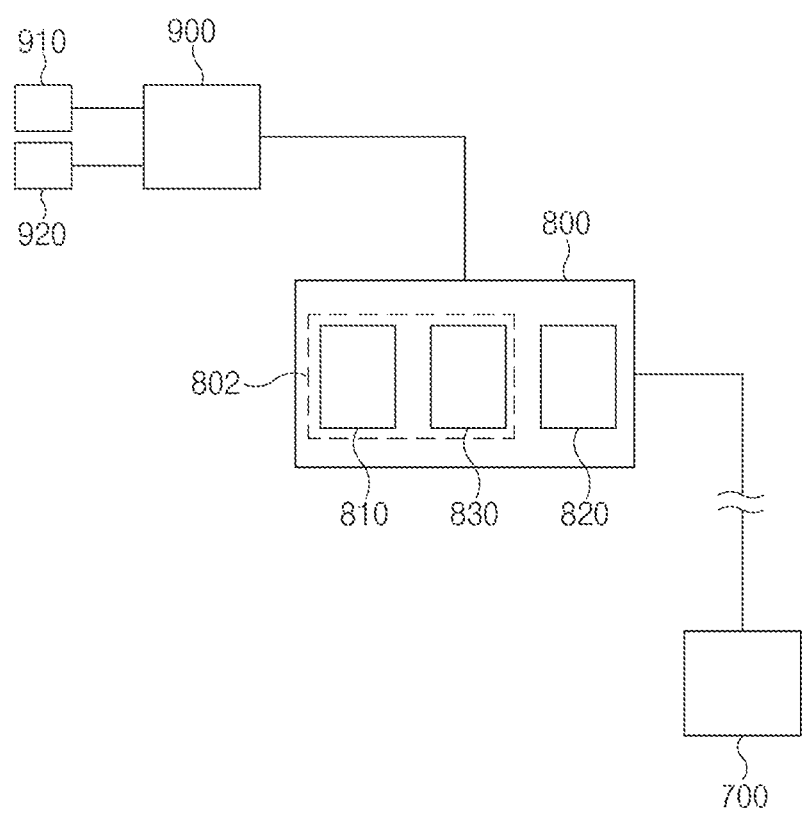
FIG. 2 is a view for explaining a fluid supply unit in the fluid charging system according to one exemplary form of the present disclosure.

Referring to FIG. 2, according to another exemplary form of the present disclosure, the anti-freezing fluid supply part 810 or the heating part 820 may be configured to serve as the moisture removing part 830 without separately providing the moisture removing part 830.

For example, the anti-freezing fluid supply part 810 and the moisture removing part 830 may be provided as a first integrated module 802 configured by integrating the anti-freezing fluid supply part 810 and the moisture removing part 830.

As another example, the heating part 820 and the moisture removing part 830 may be provided as a second integrated module (not illustrated) configured by integrating the heating part 820 and the moisture removing part 830.

As described above, since the first integrated module 802 (or the second integrated module) serves to both supply the anti-freezing fluid and remove the moisture from the anti-freezing fluid, it is not necessary to additionally provide the moisture removing part 830. As a result, it is possible to obtain an advantageous effect of simplifying the structure, improving a degree of design freedom and spatial utilization, and reducing costs required to manufacture the facility.

According to other exemplary form of the present disclosure, the anti-freezing fluid may be supplied to all positions in the cover member 700 at which the freezing occurs.

Figure 5:
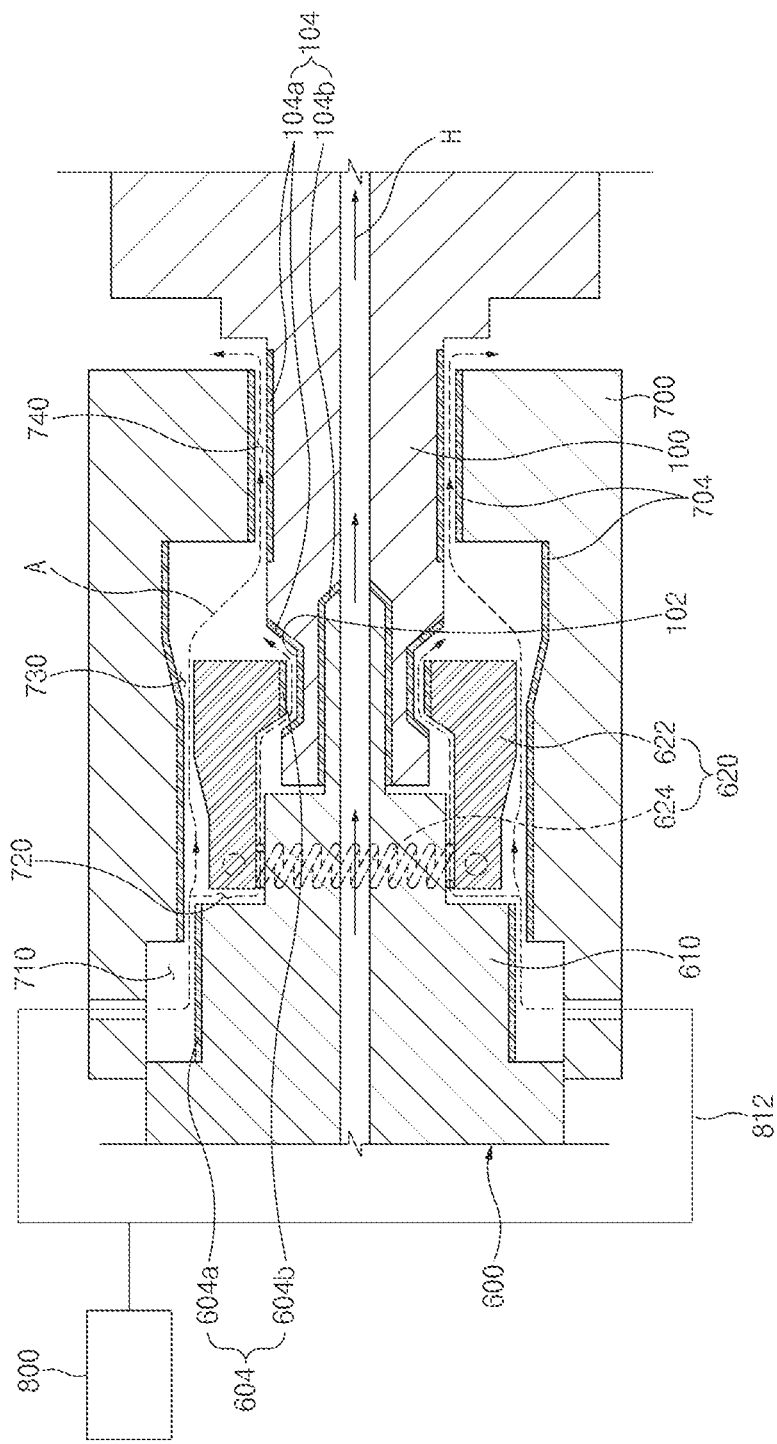
FIG. 5 is a view for explaining a flow path of an anti-freezing fluid in the fluid charging system in one form of the present disclosure.

For example, referring to FIG. 5, in the cover member 700, there may be defined a first flow path 710 into which the anti-freezing fluid is introduced from the fluid supply unit 800, a second flow path 720 formed between the nozzle body 610 and the gripping unit 620 so as to communicate with the first flow path 710, a third flow path 730 formed between the cover member 700 and the gripping unit 620 so as to communicate with the first flow path 710, and a fourth flow path 740 formed between the receptacle 100 and the cover member 700 so as to communicate with the second flow path 720 and the third flow path 730 so that the anti-freezing fluid is discharged to the outside of the cover member 700 through the fourth flow path 740. The anti-freezing fluid A supplied from the fluid supply unit 800 may sequentially pass through the first flow path 710→the second flow path 720→the fourth flow path 740 or sequentially pass through the first flow path 710→the third flow path 730→the fourth flow path 740. In addition, the anti-freezing fluid supplied from the fluid supply unit 800 may pass through the first flow path 710→the second flow path 720 and the third flow path 730→the fourth flow path 740.

In particular, a front side of the first flow path 710 (a right end of the first flow path based on FIG. 3) communicates with the second flow path 720 and the third flow path 730, a rear side of the first flow path 710 (a left end of the first flow path based on FIG. 3) is covered and blocked by the cover member 700, and the anti-freezing fluid supplied from the anti-freezing fluid supply part 810 is supplied into the first flow path 710 through the supply line 812.

As described above, since the front side of the first flow path 710 is opened and the rear side of the first flow path 710 is blocked, the anti-freezing fluid, which is supplied to the first flow path 710 through the supply line 812, may be guided to the second flow path 720 and the third flow path 730 while being prevented from leaking to the rear side of the first flow path 710 (to the outside of the cover member), and as a result, it is possible to obtain an advantageous effect of reducing the amount of anti-freezing fluid to be used and more improving efficiency in preventing freezing by the anti-freezing fluid.

According to another exemplary form of the present disclosure, the anti-freezing fluid supplied from the anti-freezing fluid supply part may be supplied into another flow path (the second flow path, the third flow path, or the fourth flow path) through the supply line except for the first flow path.

According to the exemplary form of the present disclosure, the fluid charging system 10 may include a control unit 900 configured to selectively control any one or both of a flow rate and a temperature of the anti-freezing fluid to be supplied into the cover member 700.

Depending on charging environments and conditions, the control unit 900 may optimally control the flow rate and the temperature of the anti-freezing fluid to be supplied into the cover member 700.

For reference, the control unit 900 may control the anti-freezing fluid supply part 810 to adjust the flow rate of the anti-freezing fluid to be supplied into the cover member 700, and the control unit 900 may control the heating part 820 to adjust the temperature of the anti-freezing fluid to be supplied into the cover member 700.

For example, the control unit 900 may be a central processing unit (CPU) or a semiconductor device that processes instructions stored in a memory and/or a storage. The memory and the storage may include various types of volatile or non-volatile storage media. For example, the memory may include a read only memory (ROM) and a random access memory (RAM).

In particular, the fluid charging system 10 may include a temperature sensor 910 configured to measure a temperature of outside air, and a humidity sensor 920 configured to measure humidity of outside air. The control unit 900 controls any one or both of the flow rate and the temperature of the anti-freezing fluid based on the sensed values sensed by the temperature sensor 910 and the humidity sensor 920.

Typical sensors capable of sensing the temperature and the humidity of outside air may be used as the temperature sensor 910 and the humidity sensor 920, and the present disclosure is not restricted or limited by the structures of the temperature sensor 910 and the humidity sensor 920 and the method of sensing the temperature and the humidity of outside air.

Figure 6:
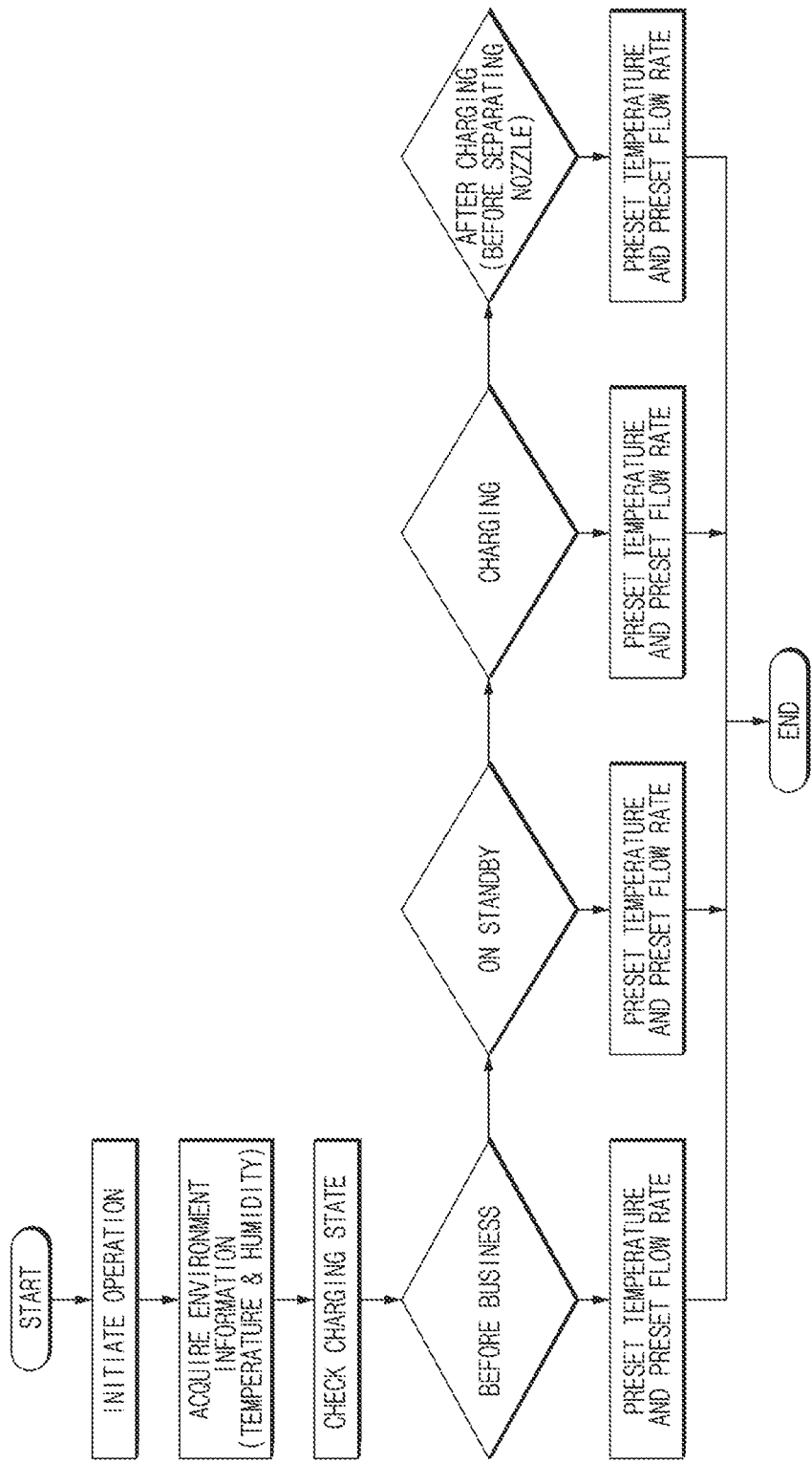
FIG. 6 is a view for explaining a method of controlling the fluid supply unit in the fluid charging system according to one exemplary form of the present disclosure.

For example, referring to FIG. 6, based on the conditions of outside air (the temperature and the humidity of outside air) (sensed values) sensed by the temperature sensor 910 and the humidity sensor 920, the control unit 900 may control the flow rate and the temperature of the anti-freezing fluid to be supplied into the cover member 700 in accordance with situations in which the hydrogen charging station operates.

For example, the operating situations of the hydrogen charging station may be classified into a pre-business situation (e.g., at late night) in which the hydrogen charging process is not performed for a long period of time, a standby situation in which the hydrogen charging process is not performed for a comparatively short period of time (e.g., a standby situation after completely charging a previous vehicle and before charging a subsequent vehicle), a charging situation in which the hydrogen charging process is being performed, and a post-charging situation immediately after completing the hydrogen charging process (e.g., a state in which the charging nozzle is not separated). In accordance with the respective operating situations (the pre-business situation, the standby situation, the charging situation, and the post-charging situation), the control unit 900 may appropriately control the flow rate and the temperature of the anti-freezing fluid to be supplied into the cover member 700.

In particular, the flow rates and the temperatures of the anti-freezing fluid, which are set in accordance with the operating situations of the hydrogen charging station, may be stored in advance in a lookup table based on the conditions of outside air (the temperature and the humidity of outside air), such that the control unit 900 may quickly control the flow rate and the temperature of the anti-freezing fluid by using the information stored in advance in the lookup table.

Specifically, when the temperature and the humidity of outside air are measured, control parameters related to the flow rate and the temperature of the anti-freezing fluid may be called.

Further, control parameters, which are not stored in advance in the lookup table, may be calculated by interpolation using an error in the adjacent control parameters stored in advance.

According to one exemplary form of the present disclosure, the fluid charging system 10 may include at least any one of a first hydrophobic coating layer 604 formed on a surface of at least any one of the nozzle body 610 and the gripping unit 620, a second hydrophobic coating layer 104 formed on at least any one of outer and inner surfaces of the receptacle 100, and a third hydrophobic coating layer 704 formed on an inner surface of the cover member 700.

In this case, the surface of at least any one of the nozzle body 610 and the gripping unit 620 is defined as including at least any one of an outer surface of the nozzle body 610 and an inner surface of the gripper 622.

For example, the first hydrophobic coating layer 604 may include a first-outer hydrophobic coating layer 604a provided on the outer surface of the nozzle body 610 that faces the inner surface of the cover member 700, and a first-inner hydrophobic coating layer 604b provided on the inner surface of the gripper 622 that faces the outer surface of the receptacle 100 (an outer surface of the receiving groove).

In addition, the second hydrophobic coating layer 104 may include a second-outer hydrophobic coating layer 104a provided on the outer surface of the receptacle 100 that faces the inner surface of the gripper 622 and the inner surface of the cover member 700, and a second-inner hydrophobic coating layer 104b provided on an inner surface of the receptacle 100 that receives an end of the nozzle body 610.

Further, the third hydrophobic coating layer 704 may be provided on the inner surface of the cover member 700 that faces an outer surface of the gripper 622 and the outer surface of the receptacle 100.

The first hydrophobic coating layer 604, the second hydrophobic coating layer 104, and the third hydrophobic coating layer 704 may be made of a polymer-based material such as Teflon (PTFE), P, or PMMA or various materials having hydrophobicity, such as polydimethylsiloxane (PDMS) or Pluronic (F127), and the present disclosure is not restricted or limited by the materials and the properties of the first hydrophobic coating layer 604, the second hydrophobic coating layer 104, and the third hydrophobic coating layer 704.

In particular, materials for forming the first hydrophobic coating layer 604, the second hydrophobic coating layer 104, and the third hydrophobic coating layer 704 may be selected in consideration of water repellency rather than durability.

If there are 'Material A' with high durability but low water repellency and 'Material B' with low durability but high water repellency, 'Material B' may be selected as the material for forming the first hydrophobic coating layer 604, the second hydrophobic coating layer 104, and the third hydrophobic coating layer 704.

In addition, the first hydrophobic coating layer 604, the second hydrophobic coating layer 104, and the third hydrophobic coating layer 704 may be formed by immersion, doping, chemical vapor deposition, plasma processing, or laser patterning (or surface reforming performed by machining), and the present disclosure is not restricted or limited by the method of forming the first hydrophobic coating layer 604, the second hydrophobic coating layer 104, and the third hydrophobic coating layer 704.

For example, each of the first hydrophobic coating layer 604, the second hydrophobic coating layer 104, and the third hydrophobic coating layer 704 may be configured by a DLC (diamond like carbon) coating.

In particular, the first hydrophobic coating layer 604, the second hydrophobic coating layer 104, and the third hydrophobic coating layer 704 may be provided by doping (mixing) fluorine (F) into the DLC. For example, in the case of a film formed by doping about 30% of fluorine (F) into the DLC, the water repellency on a surface of the film (e.g., a droplet contact angle on the surface of the film) may be improved by about 15% (e.g., the droplet contact angle may change from 79.2 degrees to 90.5 degrees).

For reference, the DLC coating has high hardness (e.g., 9H), excellent wear resistance and lubricity, non-adhesiveness (water repellency), a low frictional coefficient (0.05), excellent chemical resistance, low-temperature durability, excellent heat resistance, and excellent insulation. For example, an operating temperature, which may maintain the normal performance of the DLC coating, may be defined as −200° C. to 260° C.

As another example, each of the first hydrophobic coating layer 604, the second hydrophobic coating layer 104, and the third hydrophobic coating layer 704 may be configured by an ultra-thin glass coating (e.g., water-repellent fluorine-based glass).

For reference, the ultra-thin glass coating has a comparatively low hardness (e.g., 2H), but has very high water repellency. For example, an operating temperature, which may maintain the normal performance of the ultra-thin glass coating, may be defined as −150° C. to 150° C.

As described above, since the surface (e.g., the outer surface of the nozzle body, the inner surface of the gripping unit, and the inner surface of the receptacle, or the inner surface of the cover member), which may be frozen, is subjected to the hydrophobic treatment, such that it is possible to minimize attachment of the moisture contained in the air (e.g., the air in the cover member 700)(or the moisture contained in the anti-freezing fluid) to the surface that may be frozen, and as a result, it is possible to obtain an advantageous effect of more effectively preventing the connection part between the charging nozzle 600 and the receptacle 100 from freezing.

Figure 7:
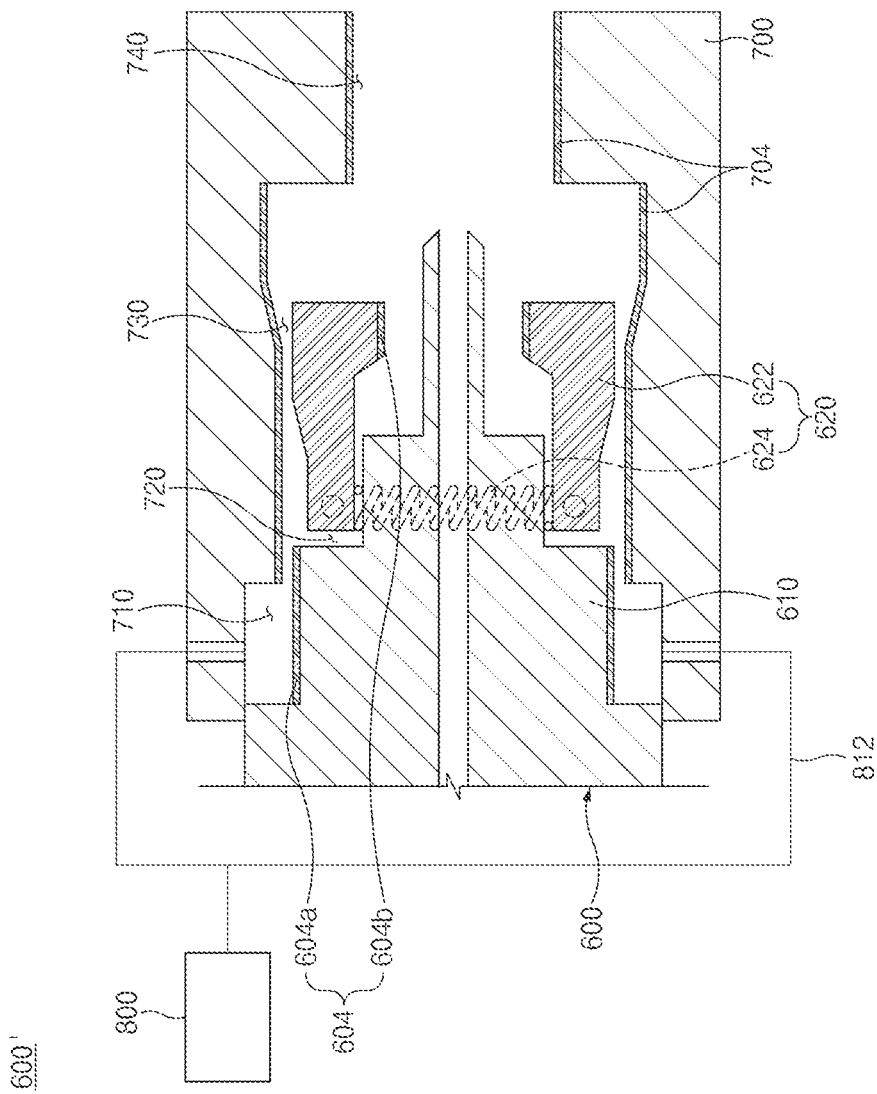
FIG. 7 is a view for explaining a nozzle device according to one exemplary form of the present disclosure.

Meanwhile, FIG. 7 is a view for explaining a nozzle device according to one exemplary form of the present disclosure. Further, the parts identical and equivalent to the parts in the above-mentioned configuration will be designated by the identical or equivalent reference numerals, and detailed descriptions thereof will be omitted.

Referring to FIG. 7, a nozzle device 600' according to one exemplary form of the present disclosure may include the charging nozzle 600 configured to supply the charging fluid and provided to be connected to the receptacle 100 provided in the subject, the cover member 700 provided to surround the charging nozzle 600 and the receptacle 100, and the fluid supply unit 800 configured to supply the interior of the cover member 700 with the anti-freezing fluid configured to inhibit freezing between the charging nozzle 600 and the receptacle 100.

For reference, FIG. 7 illustrates the example in which the nozzle device 600' includes both the first hydrophobic coating layer 604 and the third hydrophobic coating layer 704. However, according to another exemplary form of the present disclosure, the first hydrophobic coating layer 604 and the third hydrophobic coating layer 704 may be excluded from the nozzle device 600'.

Referring back to FIG. 7, according to another exemplary form of the present disclosure, the nozzle device 600' may include the charging nozzle 600 configured to supply the charging fluid and provided to be connected to the receptacle 100 (see FIG. 3) provided in the subject, and the first hydrophobic coating layer 604 provided on the surface of the charging nozzle 600.

In particular, the charging nozzle 600 may include the nozzle body 610 provided to be connected to the receptacle 100, and the gripping unit 620 connected to the nozzle body 610 and configured to be selectively constrained by the circumferential surface of the receptacle 100. The first hydrophobic coating layer 604 may be provided on the surface of at least any one of the nozzle body 610 and the gripping unit 620 (e.g., the outer surface of the nozzle body and the inner surface of the gripper).

For reference, FIG. 7 illustrates the example in which the nozzle device 600' includes all the cover member 700, the fluid supply unit 800, and the third hydrophobic coating layer 704. However, according to another exemplary form of the present disclosure, the cover member 700, the fluid supply unit 800, and the third hydrophobic coating layer 704 may be excluded from the nozzle device 600'.

Further, referring to FIG. 7, according to still another exemplary form of the present disclosure, the nozzle device 600' may include the charging nozzle 600 configured to supply the charging fluid and provided to be connected to the receptacle 100 (see FIG. 3) provided in the subject, and the third hydrophobic coating layer 704 provided on the inner surface of the cover member 700.

For reference, FIG. 7 illustrates the example in which the nozzle device 600' includes both the fluid supply unit 800 and the first hydrophobic coating layer 604. However, according to another exemplary form of the present disclosure, the fluid supply unit 800 and the first hydrophobic coating layer 604 may be excluded from the nozzle device 600'.

Figure 8:
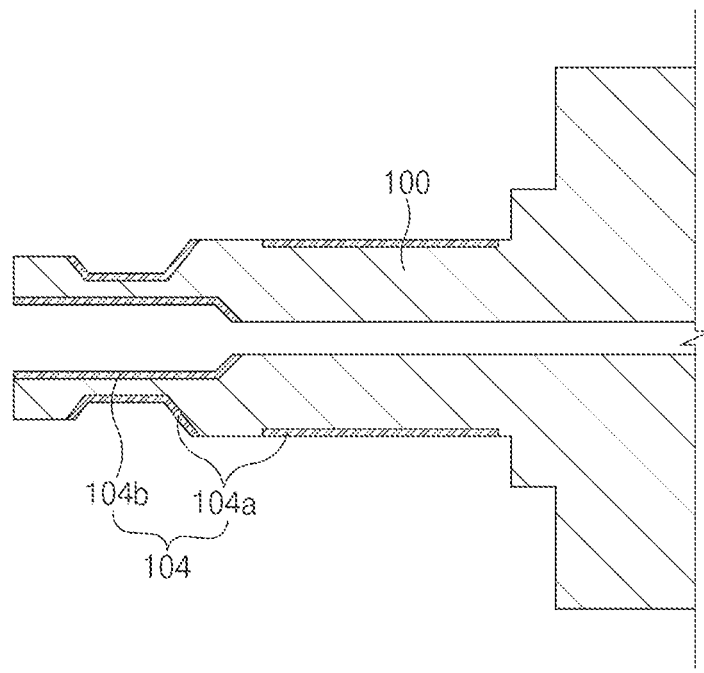
FIG. 8 is a view for explaining a receptacle device according to one exemplary form of the present disclosure.

FIG. 8 is a view for explaining a receptacle device according to one exemplary form of the present disclosure. Further, the parts identical and equivalent to the parts in the above-mentioned configuration will be designated by the identical or equivalent reference numerals, and detailed descriptions thereof will be omitted.

Referring to FIG. 8, a receptacle device 100' may include the receptacle 100 to which the charging nozzle 600 (see FIG. 3) configured to supply the charging fluid is connected, and the second hydrophobic coating layer 104 provided on at least any one of the outer surface and the inner surface of the receptacle 100.

For example, the second hydrophobic coating layer 104 may include the second-1 hydrophobic coating layer 104a provided on the outer surface of the receptacle 100, and the second-2 hydrophobic coating layer 104b provided on the inner surface of the receptacle 100.

While the exemplary forms have been described above, the exemplary forms are just illustrative and not intended to limit the present disclosure. It can be appreciated by those skilled in the art that various modifications and alterations, which are not described above, may be made to the present exemplary form without departing from the intrinsic features of the present exemplary form. For example, the respective constituent elements specifically described in the exemplary forms may be modified and then carried out. Further, it should be interpreted that the differences related to the modifications and alterations are included in the scope of the present disclosure defined by the appended claims.

According to the exemplary form of the present disclosure as described above, it is possible to obtain an advantageous effect of preventing freezing of the receptacle connected to the charging nozzle and improving safety and reliability.

In particular, according to the exemplary form of the present disclosure, it is possible to obtain an advantageous effect of preventing freezing of the receptacle during the hydrogen charging process and easily and quickly separating the charging nozzle from the receptacle after completing the hydrogen charging process.

In addition, according to the exemplary form of the present disclosure, it is possible to obtain an advantageous effect of minimizing a deterioration in durability and safety caused by freezing of the receptacle.

What is claimed is:
1. A nozzle device comprising:
   a charging nozzle configured to supply a charging fluid and provided to be connected to a receptacle provided in a subject;
   a cover member configured to surround the charging nozzle and the receptacle;
   a fluid supply unit configured to supply an interior of the cover member with an anti-freezing fluid configured to inhibit freezing between the charging nozzle and the receptacle;
   a temperature sensor configured to measure a temperature of outside air;
   a humidity sensor configured to measure humidity of the outside air; and
   a control unit configured to selectively control at least one of a flow rate or a temperature of the anti-freezing fluid to be supplied into the cover member,
   wherein the fluid supply unit comprises:
      an anti-freezing fluid supply part configured to supply the anti-freezing fluid; and
      a heating part configured to heat the anti-freezing fluid, which is supplied into the cover member from the anti-freezing fluid supply part, to a preset temperature, and
   wherein the control unit is further configured to control at least one of the flow rate or the temperature of the anti-freezing fluid based on sensed values measured by the temperature sensor and the humidity sensor.
2. The nozzle device of claim 1, wherein the charging fluid comprises hydrogen.
3. The nozzle device of claim 1, wherein the anti-freezing fluid comprises air.
4. The nozzle device of claim 1, wherein the charging nozzle comprises:
   a nozzle body connected to the receptacle; and
   a gripping unit connected to the nozzle body and configured to be selectively constrained by a circumferential surface of the receptacle.

5. The nozzle device of claim 4, wherein the gripping unit comprises:
a gripper rotatably connected to the nozzle body and configured to be supported on the circumferential surface of the receptacle; and
an elastic member configured to elastically support a rotation of the gripper with respect to the nozzle body.

6. The nozzle device of claim 1, wherein the fluid supply unit comprises a moisture removing part configured to remove moisture from the anti-freezing fluid to be supplied into the cover member from the anti-freezing fluid supply part.

7. The nozzle device of claim 6, wherein the anti-freezing fluid supply part and the moisture removing part are integrated to each other and provided as an integrated module.

8. The nozzle device of claim 6, wherein the heating part and the moisture removing part are integrated to each other and provided as an integrated module.

9. A nozzle device comprising:
a charging nozzle configured to supply a charging fluid and provided to be connected to a receptacle provided in a subject;
a cover member configured to surround the charging nozzle and the receptacle;
a fluid supply unit configured to supply an interior of the cover member with an anti-freezing fluid configured to inhibit freezing between the charging nozzle and the receptacle,
wherein the charging nozzle comprises:
a nozzle body connected to the receptacle, and
a gripping unit connected to the nozzle body and configured to be selectively constrained by a circumferential surface of the receptacle;
a first flow path formed in the cover member and configured to introduce the anti-freezing fluid into the first flow path from the fluid supply unit;
a second flow path formed between the nozzle body and the gripping unit and configured to communicate with the first flow path;
a third flow path formed between the cover member and the gripping unit and configured to communicate with the first flow path; and
a fourth flow path formed between the receptacle and the cover member and configured to communicate with the second flow path and the third flow path such that the anti-freezing fluid is discharged to an outside of the cover member through the fourth flow path.

10. A nozzle device comprising:
a charging nozzle configured to supply a charging fluid and provided to be connected to a receptacle provided in a subject;
a cover member configured to surround the charging nozzle and the receptacle;
a fluid supply unit configured to supply an interior of the cover member with an anti-freezing fluid configured to inhibit freezing between the charging nozzle and the receptacle,
wherein the charging nozzle comprises:
a nozzle body connected to the receptacle, and
a gripping unit connected to the nozzle body and configured to be selectively constrained by a circumferential surface of the receptacle; and
a first hydrophobic coating layer formed on a surface of at least one of the nozzle body or the gripping unit.

11. A nozzle device comprising:
a charging nozzle configured to supply a charging fluid and provided to be connected to a receptacle provided in a subject;
a cover member configured to surround the charging nozzle and the receptacle;
a fluid supply unit configured to supply an interior of the cover member with an anti-freezing fluid configured to inhibit freezing between the charging nozzle and the receptacle; and
an inner hydrophobic coating layer provided on an inner surface of the cover member.

12. A nozzle device comprising:
a charging nozzle configured to supply a charging fluid and provided to be connected to a receptacle provided in a subject;
a cover member configured to surround the charging nozzle and the receptacle; and
an inner hydrophobic coating layer provided on an inner surface of the cover member.

13. A fluid charging system comprising:
a charging nozzle configured to supply a charging fluid;
a receptacle provided in a subject and configured to be connected to the charging nozzle;
a cover member provided to surround the charging nozzle and the receptacle;
a fluid supply unit configured to supply an interior of the cover member with an anti-freezing fluid configured to inhibit freezing between the charging nozzle and the receptacle;
a temperature sensor configured to measure a temperature of outside air;
a humidity sensor configured to measure humidity of the outside air; and
a control unit configured to selectively control at least one of a flow rate or a temperature of the anti-freezing fluid to be supplied into the cover member,
wherein the fluid supply unit comprises:
an anti-freezing fluid supply part configured to supply the anti-freezing fluid; and
a heating part configured to heat the anti-freezing fluid, which is supplied into the cover member from the anti-freezing fluid supply part, to a preset temperature, and
wherein the control unit is further configured to control at least one of the flow rate or the temperature of the anti-freezing fluid based on sensed values measured by the temperature sensor and the humidity sensor.

14. A fluid charging system comprising:
a charging nozzle configured to supply a charging fluid;
a receptacle provided in a subject and configured to be connected to the charging nozzle;
a cover member provided to surround the charging nozzle and the receptacle; and
a hydrophobic coating layer provided on at least one of a surface of the charging nozzle, a surface of the receptacle, or an inner surface of the cover member.

15. The fluid charging system of claim 14, further comprising:
a fluid supply unit configured to supply an interior of the cover member with an anti-freezing fluid configured to inhibit freezing between the charging nozzle and the receptacle.

* * * * *